(12) United States Patent
Radbrant et al.

(10) Patent No.: US 8,081,497 B2
(45) Date of Patent: Dec. 20, 2011

(54) CONVERTER STATION

(75) Inventors: Ulf Radbrant, Ludvika (SE); Lars-Erik Juhlin, Ludvika (SE)

(73) Assignee: ABB Technology Ltd., Zürich (CH)

( * ) Notice: Subject to any disclaimer, the term of this patent is extended or adjusted under 35 U.S.C. 154(b) by 567 days.

(21) Appl. No.: 12/161,380

(22) PCT Filed: Jun. 15, 2006

(86) PCT No.: PCT/SE2006/000712
§ 371 (c)(1),
(2), (4) Date: Nov. 20, 2008

(87) PCT Pub. No.: WO2007/084035
PCT Pub. Date: Jul. 26, 2007

(65) Prior Publication Data
US 2009/0201702 A1 Aug. 13, 2009

Related U.S. Application Data

(60) Provisional application No. 60/759,563, filed on Jan. 18, 2006.

(51) Int. Cl.
*H02J 3/38* (2006.01)
*H02J 3/44* (2006.01)
(52) U.S. Cl. ............... 363/35; 363/51; 363/65; 307/71; 307/86
(58) Field of Classification Search ............... 363/34–35, 363/37, 50, 65; 361/18, 23, 93.1; 307/71, 307/82, 86, 87
See application file for complete search history.

(56) References Cited

U.S. PATENT DOCUMENTS

| 3,952,210 | A | | 4/1976 | Kanngiesser | |
|---|---|---|---|---|---|
| 4,419,591 | A | * | 12/1983 | Irokawa et al. | 307/45 |
| 4,459,492 | A | * | 7/1984 | Rogowsky | 307/82 |
| 5,187,651 | A | | 2/1993 | Ekström | |

FOREIGN PATENT DOCUMENTS

| EP | 0 645 867 A1 | 3/1995 |
|---|---|---|
| EP | 0 736 949 A1 | 10/1996 |
| GB | 1151854 | 5/1969 |
| RU | 2 089 986 C1 | 9/1997 |
| RU | 2002111927 A | 11/2003 |
| WO | WO 90/16104 | 12/1990 |

OTHER PUBLICATIONS

International Search Report, dated Oct. 18, 2006, issued in Counterpart Application No. PCT/SE2006/000712.
Decision on Grant Patent for Invention, issued by the Russian Patent Office (along with an English translation) in counterpart Russian Application No. 2008133587/09(042289).

* cited by examiner

*Primary Examiner* — Gary L Laxton
*Assistant Examiner* — Nusrat Quddus
(74) *Attorney, Agent, or Firm* — Venable LLP; Eric J. Franklin

(57) ABSTRACT

A converter station for connecting an AC system to a bipolar HVDC transmission line. A DC neutral arrangement includes first DC breakers enabling breaking of a first current path from the neutral bus of one pole to the neutral bus of the other pole at bipolar operation of the station for changing to monopolar operation thereof for isolation of a faulty section of the system while establishing a current path to electrode line connecting members for diverting the current from the one pole thereto. A separate connecting member is provided for each of the electrode lines. A connector is configured to connect each neutral bus to an optional of the two electrode line connecting members.

12 Claims, 4 Drawing Sheets

CONVERTER STATION

CROSS-REFERENCE TO RELATED APPLICATIONS

This application claims priority to U.S. provisional patent application 60/759,583 filed 18 Jan. 2006 and is the national phase under 35 U.S.C. §371 of PCT/SE2006/000712 filed 15 Jun. 2006.

TECHNICAL FIELD OF THE INVENTION AND PRIOR ART

The present invention relates to a converter station for connecting an AC system to a bipolar HVDC transmission line, said station comprising two converters each having a DC-side thereof connected on one hand to a respective of two poles of said transmission line on high potential and on the other to a neutral bus for that pole of a DC neutral arrangement in common to the converters on zero potential by being earthed, and having an AC-side connected to said AC system; said DC neutral arrangement having a member connecting to two electrode lines and the arrangement being provided with first DC breakers enabling breaking of a first current path from the neutral bus of one pole to the neutral bus of the other pole at bipolar operation of the station for changing to monopolar operation thereof, the station also comprising a control device adapted to control a said changing from bipolar to monopolar operation by controlling a said first DC breaker to open said current path between said two neutral buses and establish a current path to said electrode line connecting member for diverting the current from said one pole thereto. Such change to monopolar operation will take place for isolating a faulty section of the system and changing to metallic return.

The invention is not restricted to any particular levels of voltage between earth and each said pole of the HVDC (High Voltage Direct Current) transmission line, but it is especially applicable to such voltages above 500 kV, which means that said transmission line transmits a substantial power and the transmission system to which the converter station belongs requires a very high level of reliability. Neither is the invention restricted to any particular levels of currents through said poles of a said transmission line, but said lines are preferably rated for currents above 1 kA.

The general design of a HVDC transmission system of this type is schematically shown in FIG. 1. It is shown how a converter station 1, 2 is arranged at each end of a HVDC transmission line 3 having two poles 4, 5, one with positive and one with negative polarity. An AC system 6, 6' is connected to each converter station through transformers 7, 7' for obtaining a suitable level of the voltage of said DC system. The AC system may be a generating system in the form of any type of power plant with generators of electricity or a consuming system or network connecting to consumers of electric power, such as industries and communities. Each converter station has two converters 8, 9 each having a DC-side thereof connected on one hand to a respective of said two poles 4, 5 and on the other to a DC neutral arrangement 10 in common to the converters and connecting the low voltage side thereof to earth for defining a certain voltage on each pole. Each converter 8, 9 may be replaced by a set of converters, such as two or three, connected in series for obtaining high voltages, may be in the order of 800 kV. The converters include a number of current valves in any known configuration, for instance in a 12-pulse bridge configuration. The converters may be line commutated Current Source Converters in which the switching elements, such as thyristors, are turned off at zero crossing of the AC current in said AC system. The converters may also be forced commutated Voltage Source Converters, in which said switching elements are turn-off devices controlled according to a Pulse Width Modulation (PWM) pattern.

An advantage of a HVDC transmission system with respect to an AC transmission system is that remarkably lower losses result in the transmission line between the two converter stations at each end of these lines, whereas the converter stations are mostly more costly in a HVDC transmission system than in a AC transmission system. HVDC transmission systems are therefore mostly used to transmit much power, often in the order of some GW, over long distances, such as hundreds of kilometres. This means that the consequence for the connected AC systems can be very severe if both poles of the transmission line would be tripped, i.e. be disconnected as a consequence of for instance an earth fault, at the same time. If a said AC system belongs to a major system providing a large city with electric power such a bipolar trip may result in such a large reduction of the electric power supplied to said major system, that unstabilities may be created in that system and other parts may then also fail. The consequence for the connecting AC system if only one pole is tripped is not half as severe as if both poles would be tripped. The present invention is occupied with the reliability of converter stations of the type defined in the introduction, which is closely related to the function of said DC neutral arrangement thereof, and a traditional DC neutral arrangement of a known converter station is shown in FIG. 2. This arrangement 10 has a neutral bus 11 connecting to the low voltage side of one converter 8 and a neutral bus 12 connecting to the low voltage side of the other converter 9. The neutral buses are connected to each other through a series connection of two first DC breakers 13, 14 and a disconnector 15, 16 associated with each DC breaker 13, 14. The midpoint 17 of this series connection between the first DC breaker and disconnector associated with one neutral bus and those associated with the other neutral bus is through a line 18 including disconnectors connected to a member 19 connecting to two electrode lines 20, 21 extending from the converter station to an electrode station 22, the function of which will be described further below. The DC neutral arrangement 10 also comprises a grounding switch 23 connected through lines including disconnectors to a point 24, 24' between the first DC breaker and the disconnector associated with each neutral bus 11, 12.

The function of a converter station having this known DC neutral arrangement shown in FIG. 2 is as follows. During bipolar operation of the converter station assumed to function as rectifier a current flows in the negative polarity pole 5 to the converter 9 and through the neutral bus 12 further to the neutral bus 11 having the first DC breakers 13, 14 and disconnectors 15, 16 closed therebetween. The current flows further through the converter 8 and to the other pole 4 with positive polarity of the HVDC transmission line according to the arrows 25. The disconnectors in the line 18 to the electrode line connecting member 19 are closed to define zero potential of the neutral.

We assume that an earth fault now occurs at the DC side for the pole 4, and FIG. 3 illustrates how the converter station and especially the DC neutral arrangement thereof will then act. The current valves of the converter 8 will then be blocked with by-pass pairs, which means that series connected current valves are fired and thereby the AC side is by-passed for protecting said AC system 6 and equipment connected thereto. These by-pass pairs will form a low impedance connection between the DC pole 4 and the DC neutral arrangement. It is shown by dots how the current will then flow to the earth fault 26. However, it is important to quickly isolate the earth fault 26 for maintaining the other pole 5 in operation. The disconnectors of the line 18 are closed for forming a current path to the electrode line connecting member 19 and through the electrode lines 20, 21 to the electrode station 22. The DC current of the pole 5 will now be shared by two current paths, one via the electrode lines to earth and one via the other pole 4 to the earth fault. About half the current will go in each of the two current paths. In order to isolate the earth fault the first DC breaker 13 is opened, so that all current will go through the electrode lines to the electrode station. When the DC breaker 13 is opened the disconnectors 15 and 15' at the neutral bus as well as a disconnector 27 at the pole 4 are opened to fulfil the isolation of the faulty pole 4.

If the DC breaker 13 fails to bring the current through it down to zero, i.e. commutate that current to the electrode lines, it will be reclosed. The grounding switch 23 is then closed as a backup for the DC breaker 13 while forming a low impedance connection between the neutral bus 12 and earth. Almost all current of the "healthy" pole 5 will then go down into the station earth grid, and the current through the other pole 4 will thereby go down to almost zero, so that the disconnectors 15, 27 and 15' may then be opened to fulfil the isolation. When the pole 4 is isolated the grounding switch 23 is opened and all current will be commutated to the electrode lines. The converter station and the HVDC transmission system is then in monopolar operation, so that half the power as in bipolar operation may still be delivered. As soon as possible, normally within about a minute a connection of the neutral bus 12 to the pole 4 will be obtained by closing disconnectors and a switch diverting the current according to the arrows 28 for metallic return instead of earth return through the electrode station if it would be necessary to maintain the monopolar operation of the system for not charging the earth of the electrode station too much.

The operation of the different components of the DC neutral arrangement will be correspondingly if an earth fault would instead occur at the other pole 5, so that then the breaker 14 and the disconnector 16 will be opened for conducting the current to the electrode station and so on.

The DC neutral arrangement of such a known converter station provides a quite good reliability but has still some drawbacks. It is not possible to separate the two electrode lines, which means that the entire electrode station connection will fail if an earth fault would appear in one of them, so that a detrimental bipolar trip of the system may then occur. It is neither possible to check the proper operation of each electrode line when not in use. Another drawback is that the grounding switch described above is the backup for each first DC breaker 13, 14, since this will during the time it is closed lift the potential of the earth grid due to the high current therethrough. The neutral point of the trans-formers of the converter station is connected to this earth grid, and this potential rise leads to a DC current through the trans-formers and thereby to a risk that also the other pole is tripped. Another disadvantage is that it is not possible to perform maintenance of the first DC breakers during bipolar operation of the converter station.

SUMMARY OF THE INVENTION

The object of the present invention is to provide a converter station of the type defined in the introduction, which reduces at least one of the drawbacks mentioned above of such a converter station already known.

This object is according to the invention obtained by providing such a converter station in which said neutral arrangement is provided with a separate said connecting member for each of said electrode lines and means for connecting each neutral bus to an optional of said two electrode line connecting members. This reduces the risk of bipolar trips of the HVDC transmission system to which the converter station belongs substantially, since it will be possible to independently check the proper function of each electrode line and the equipment connected thereto during bipolar operation of the converter station, so that it may be ensured that these electrode lines will really function properly once they have to be used. Furthermore, if an earth fault would appear in one of the electrode lines when changing to monopolar operation the neutral bus in question will be through said means connected to the other electrode line and the faulty electrode line be isolated for not jeopardizing said monopolar operation.

According to an embodiment of the invention said connecting means comprises for each said neutral bus in a first line separate from said first current path including said first DC breaker and connecting that bus to one of the electrode line connecting members associated with that bus at least one disconnector and/or DC breaker and in a second line interconnecting said two first lines closer to the respective bus than the location of said at least one disconnector and/or breaker at least one disconnector and DC breaker. This means that each neutral bus may through operation of said DC breaker and/or disconnectors be connected to an optional of said electrode line connecting members or both of them for disconnecting any of the electrode lines when an earth fault appears on one of them and by that isolating the earth fault or for even checking the status or performing maintenance thereof during monopolar operation.

According to another embodiment of the invention said interconnecting second line is provided with a DC breaker connected in series with a disconnector on each side thereof.

According to a further embodiment of the invention said connecting means comprises for each first line connecting a neutral bus to one of said electrode line connecting members a series connection of a DC breaker and a disconnector closer to the neutral bus in question than the point of connection of said interconnecting second line to this first line. This means that a further current path having at least two DC breakers in series may be established between said two neutral buses beside said first current path, which means that maintenance on said first DC breaker of said first current path and also of this additional current path may be carried out during bipolar operation of the converter station. Furthermore, when said second line is provided with a DC breaker this will also function as a backup for the two DC breakers of said first lines.

According to another embodiment of the invention said DC neutral arrangement comprises an additional second DC breaker connected in series with said first DC breaker in said first current path between said two neutral buses for bipolar operation of the station. This means that these two DC breakers connected in series will function as backup for each other when the current path is to be opened for diverting the current to the electrode station, so that it may be avoided to close a grounding switch if one of the breakers will not be able to bring the current through it down to zero.

According to another embodiment of the invention a midpoint between said first and second DC breaker in said first current path is by a first disconnector connected to a midpoint of a line interconnecting said two poles of the HVDC transmission line, said first disconnector being adapted to be open at bipolar operation of the station, the line interconnecting said two poles is provided with a disconnector on both sides of said midpoint, and said control device is adapted to control said first disconnector to close and a disconnector connecting to one of the poles to close for metallic return of the current from the other pole at monopolar operation of the station after trip of said one pole.

According to another embodiment of the invention the converter station comprises a grounding switch connected to said first current path between the two neutral buses at a point between said first DC breaker and said additional DC breaker. This is for a further backup if the first as well as the second DC breaker would fail, which however is quite unlikely.

According to another embodiment of the invention said control device is adapted to control said DC breakers and disconnectors in each said first line and said interconnecting second line to close and establish a second current path between the two neutral buses through said first lines and said interconnecting second line for enabling maintenance of the equipment, such as a breaker, in said first current path at bipolar operation of the station.

According to another embodiment of the invention the station is adapted for connecting an AC system to a bipolar HVDC transmission line adapted to have a voltage between each pole thereof and earth exceeding 200 kV, advantageously exceeding 500 kV, preferably being 600 kV-1500 kV and most preferably being 600 kV-1000 kV. A converter station according to the invention is mostly the more interesting the higher said voltage and thereby the power transmitted through said HVDC transmission line are, since this would then also mean that the reliability requirements will be higher.

Further advantages as well as advantageous features of the invention will appear from the following description.

BRIEF DESCRIPTION OF THE DRAWINGS

With reference to the appended drawings below follows a specific description of a converter station according to an embodiment of the invention.

In the drawings.

DETAILED DESCRIPTION OF AN EMBODIMENT OF THE INVENTION

Figure 1:
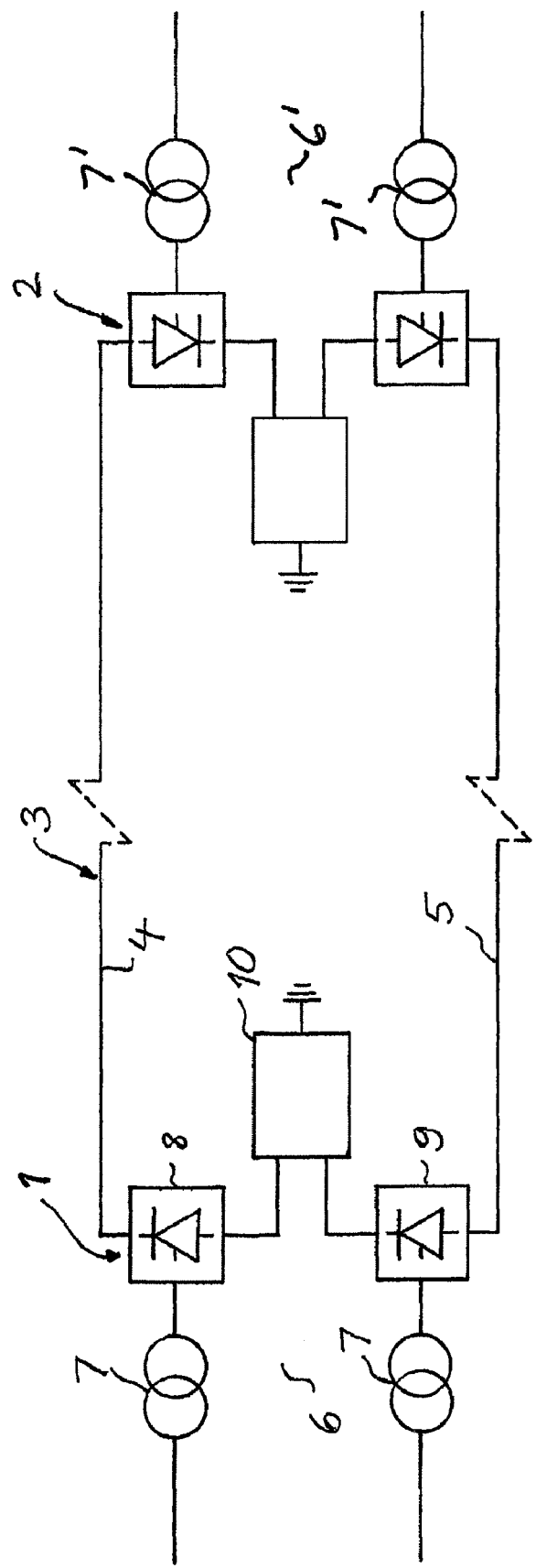
FIG. 1 is a very schematic view illustrating the general structure of a HVDC transmission system.
Figure 2:
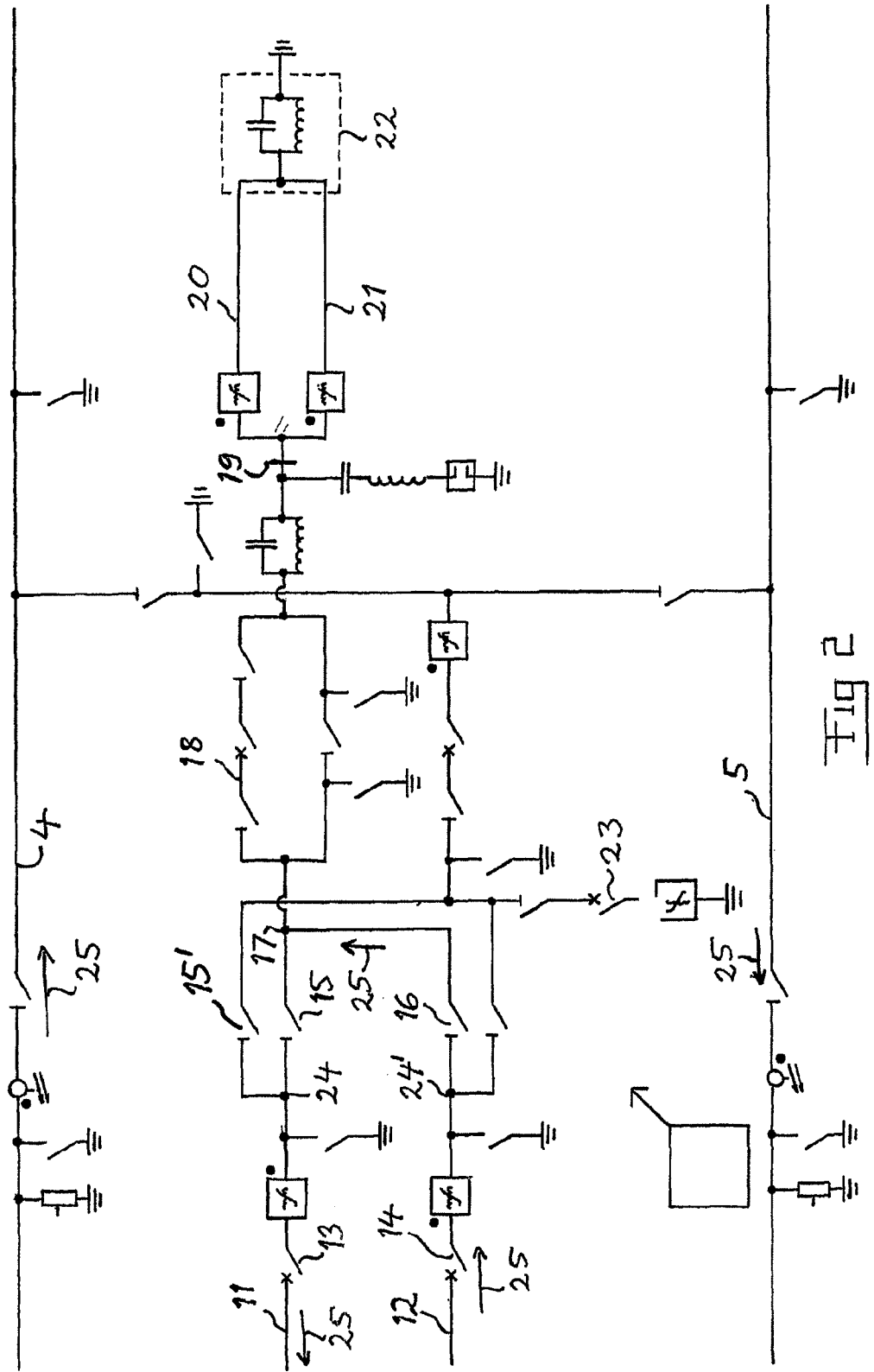
FIG. 2 is a schematic circuit diagram illustrating the structure of a DC neutral arrangement included in a known converter station of a HVDC transmission system.

The two poles are here designated by 104 and 105 and the two neutral buses by 111 and 112. The poles 104, 105 are here intended to have a polarity of +800 kV and −800 kV, respectively. The neutral buses 111, 112 are connected to each other through a first current path 130, in which a first DC breaker 131 and a second DC breaker 132 are connected in series. Each of these DC breakers are surrounded by two disconnectors 133-136.

Each neutral bus is further through a first line 140, 141 connected to one of two separate electrode line connecting members 142, 143. Each first line is provided with a DC breaker 144, 145 surrounded by two disconnectors 146-149 closer to the neutral bus in question than a point of connection of a second line 150 interconnecting said two first lines. This second line 150 has a DC breaker 151 surrounded by two disconnectors 152, 153. Furthermore, each first line has a disconnector 160, 161 closer to the respective electrode line connecting member than the point of interconnection of the second line 150 to said first line.

A grounding switch 170 is connected to said first current path 130 between the two DC breakers 131, 132 with associated disconnectors, and the first current path 130 is there also connected through a disconnector 180 to a midpoint of a line 181 interconnecting said two poles 104, 105 of the HVDC transmission line. This disconnector 180 is adapted to be open at bipolar operation of the station. The line interconnecting the two poles is further provided with a disconnector 182, 183 at both sides of said midpoint.

It is also illustrated how a number of direct current measuring devices are arranged for supervising the function of different parts of the DC neutral arrangement, such as indicated by 210. Trap filters 211 and injection circuits 212 for electrode line impedance supervision are also indicated in the figure.

The function of this neutral arrangement is as follows. During bipolar operation of the HVDC transmission system to which the converter station belongs a current will flow between the two neutral buses in/a first current path 130 with the DC breakers 131, 132 as well as the disconnectors 133, 136 closed and also through a second current path going through the closed DC breakers 144, 145 and disconnectors 146-149 as well as the closed DC breaker 151 and disconnectors 152, 153 of the second line 150. The disconnectors 160, 161 will be closed connecting the electrode station to said neutral buses for polarity definition. Maintenance of all equipment of this DC neutral arrangement is now possible without any outage at bipolar operation. The DC breakers in said first current path 130 may be opened and the function of them be tested or maintenance thereupon may be carried out while conducing the current between the two neutral buses through the second current path leading through the second line 150. The proper function of the equipment in these second-current path may also be checked while conducting the current between the two neutral buses through said first current path 130. It is also possible to check the equipment of the two electrode lines and carry out maintenance on the equipment of one electrode line at the time without any risk that a trip of one pole may result in a bipolar trip of the converter station. When carrying out maintenance of for instance the DC breaker 131 during bipolar operation of the converter station the two disconnectors 133 and 134 are open after opening the DC breaker 131. The corresponding is applicable for the DC breaker 132.

Figure 3:
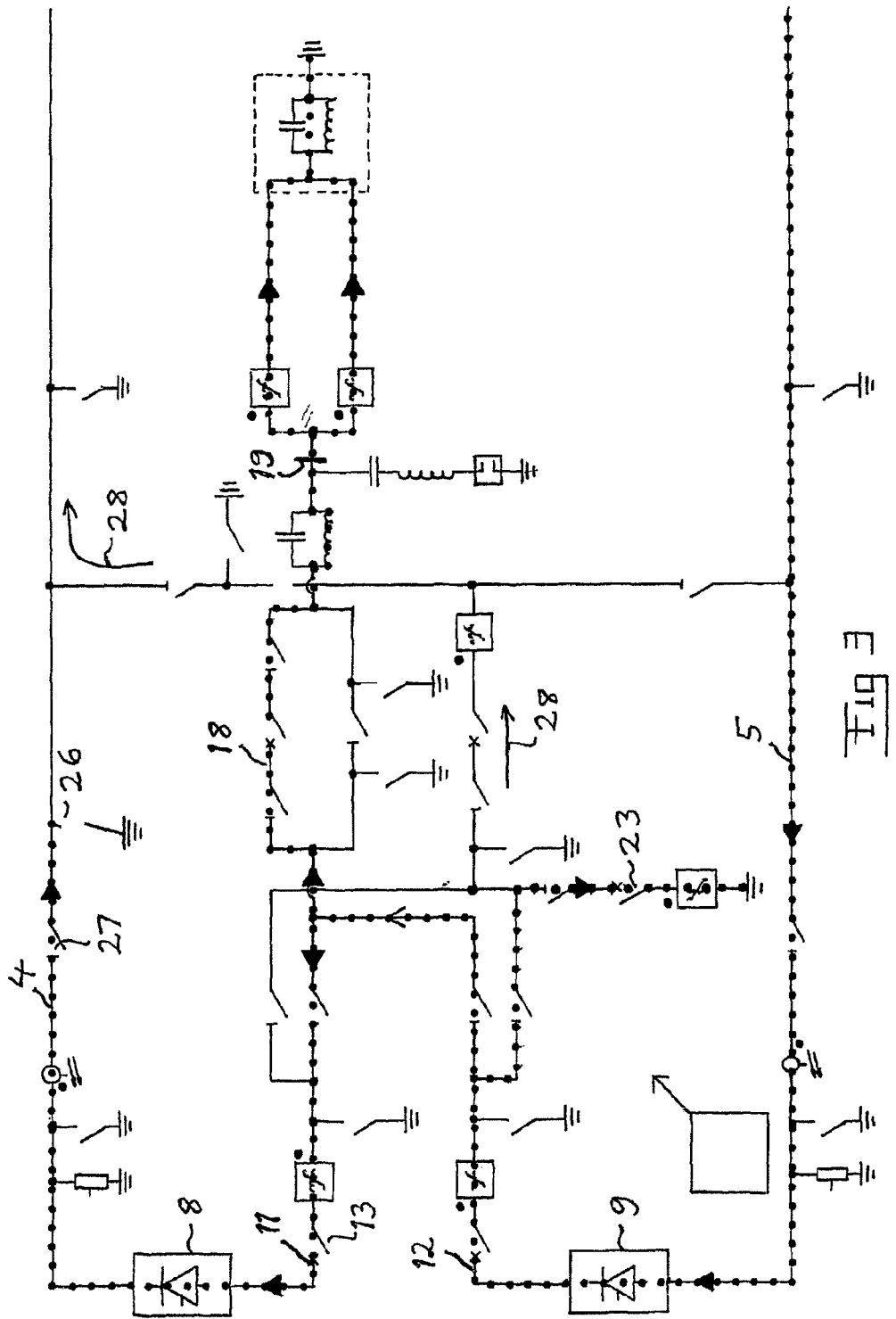
FIG. 3 is a view of the DC neutral arrangement according to FIG. 2 used for explaining the function thereof when an earth fault appears on one pole.
Figure 4:
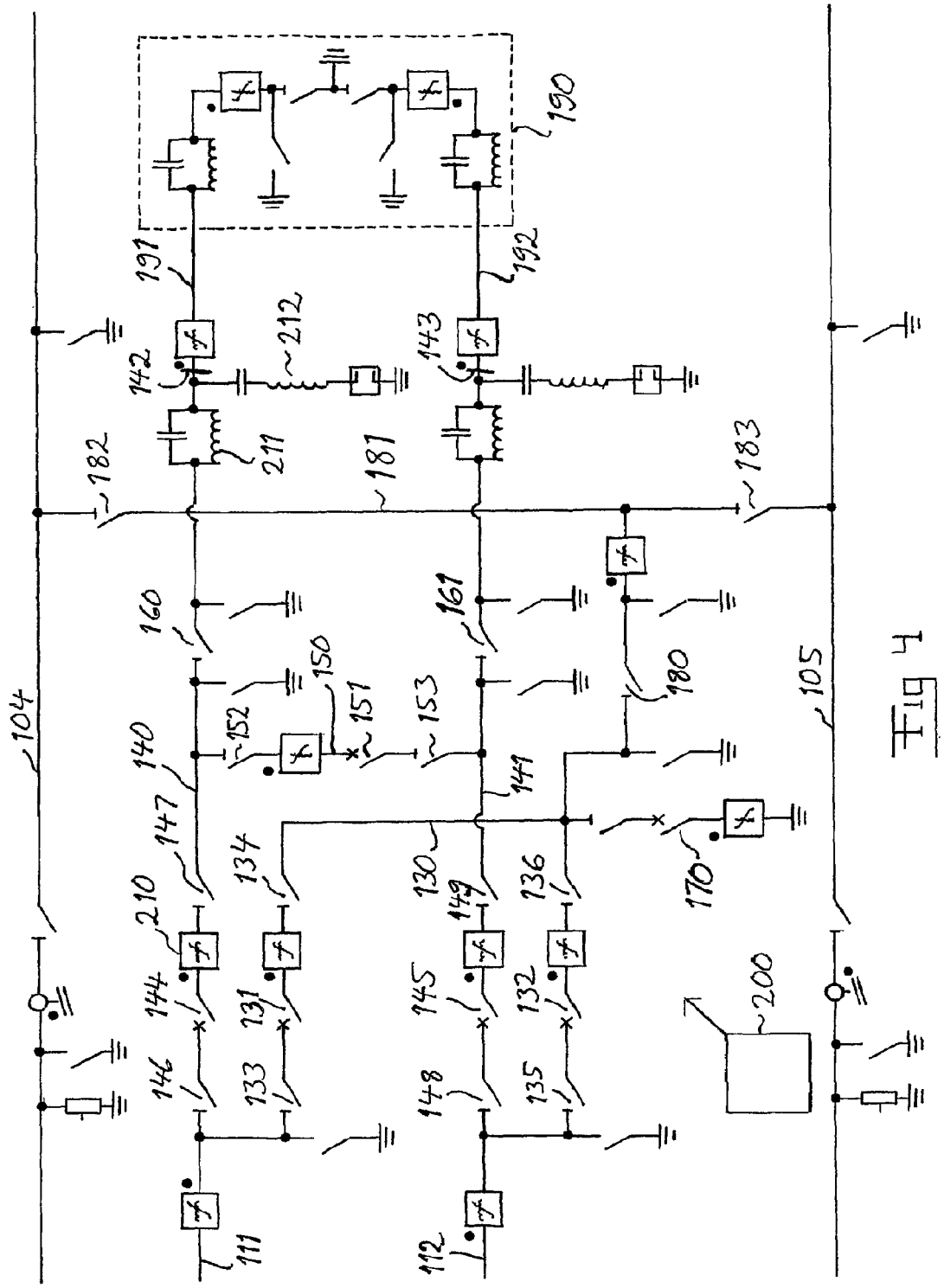
FIG. 4 is a view corresponding to FIG. 2 of the DC neutral arrangement in a converter station according to an embodiment of the present invention.

We now assume that an earth fault as described above with reference to FIG. 3 appear on the pole 104. The DC breaker 144 will then be opened with the DC breaker 151 as backup if DC breaker 144 would be reclosed. Furthermore, the first DC breaker 131 will be controlled to open, and when this succeeds to bring the current down to zero one of the disconnectors 133 and 134 will also be opened. However, if the first DC breaker 131 fails the second DC breaker 132 will function as backup and be controlled to open. For further backup the grounding switch 170 will function as described with reference to FIG. 3.

The current from the neutral bus 112 will flow to the electrode line connecting members 142, 143 and therethrough to the electrode station 190. The DC breaker 151 is for that sake reclosed if it is needed as a backup for the DC breaker 144. However, if an earth fault occurs on the first electrode line 191 or equipment associated therewith the connection between the neutral bus 112 and the electrode line connecting member 142 will be broken by controlling the DC breaker 151 to open and then open any of the disconnectors 161, 152 and 153. If on the other an earth fault would occur in the electrode line 192 or any equipment associated therewith the disconnector 161 will open and all the current from the neutral bus 112 will be conducted to the electrode line connecting member 142.

As soon as the faulty section is isolated, the disconnector 180 and the disconnector 182 can be closed for metallic return of the current to the pole 104 while breaking the connections of the neutral bus 112 to the electrode station 190 for not conducting too much current into the ground of the electrode station.

The invention is of course not in any way restricted to the embodiment described above but many possibilities to modifications thereof will be apparent to a person with ordinary skill in the art without departing from the basic idea of the invention as defined in the appended claims.

It may for instance be possible to have another number than two DC breakers connected in series in said first current path.

Furthermore, it is for instance conceivable to have more than two electrode line connecting members for connecting more than two electrode lines with associated equipment to the neutral buses.

The invention claimed is:

1. A converter station for connecting an AC system to a bipolar HVDC transmission line, said converter station comprising:

two converters each having a DC-side thereof connected to a respective one of two poles of said transmission line on high potential and to a neutral bus for that pole of a DC neutral arrangement in common to the converters on zero potential by being earthed, and having an AC-side connected to said AC system, said DC neutral arrangement having a member connecting to two electrode lines and the arrangement being provided with first DC breakers enabling breaking of a first current path from the neutral bus of one pole to the neutral bus of the other pole at bipolar operation of the station for changing to monopolar operation thereof, a control device adapted to control a said changing from bipolar to monopolar operation by controlling a first DC breaker to open said current path between said two neutral buses and establish a current path to said electrode line connecting member for diverting the current from said one pole thereto, wherein said neutral arrangement is provided with two connecting members, one for each electrode line and a connector configured to connect each neutral bus to an optional of said two electrode line connecting members.

2. The converter station according to claim 1, wherein said connector comprises for each said neutral bus in a first line separate from said first current path including said first DC breaker and connecting that bus to one of the electrode line connecting members associated with that bus at least one disconnector and/or DC breaker and in a second line interconnecting said two first lines closer to the respective bus than the location of said at least one disconnector and/or breaker at least one disconnector and DC breaker.

3. The converter station according to claim 2, wherein said interconnecting second line comprises a DC breaker connected in series with a disconnector on each side thereof.

4. The converter station according to claim 2, wherein said connector comprises for each first line connecting a neutral bus to one of said electrode line connecting members a series connection of a DC breaker and a disconnector closer to the neutral bus in question than the point of connection of said interconnecting second line to this first line.

5. The converter station according to claim 1, wherein said DC neutral arrangement comprises an additional second DC breaker connected in series with said first DC breaker in said first current path between said two neutral buses for bipolar operation of the station.

6. The converter station according to claim 5, wherein a midpoint between said first and second DC breaker in said first current path is by a first disconnector connected to a midpoint of a line interconnecting said two poles of the HVDC transmission line, said first disconnector being adapted to be open at bi-polar operation of the station, wherein the line interconnecting said two poles is provided with a disconnector at both sides of said midpoint, and wherein said control device is adapted to control said first disconnector to close and a disconnector connecting to one of the poles to close for metallic return of the current from the other pole at monopolar operation of the station after trip of said one pole.

7. The converter station according to claim 5, further comprising:

a grounding switch connected to said first current path between the two neutral buses at a point between said first DC breaker and said additional second DC breaker.

8. The converter station according to claim 4, said control device is adapted to control said DC breakers and disconnectors in each said first line and said interconnecting second line to close and establish a second current path between the two neutral buses through said first lines and said interconnecting second line for enabling maintenance of equipment in said first current path at bipolar operation of the station.

9. The converter station according to claim 1, wherein the converter station is adapted for connecting an AC system to a bipolar HVDC transmission line adapted to have a voltage between each pole thereof and earth exceeding 200 kV.

10. The converter station according to claim 1, wherein the converter station is adapted for connecting an AC system to a bipolar HVDC transmission line adapted to have a voltage between each pole thereof and earth exceeding 500 kV.

11. The converter station according to claim 1, wherein the converter station is adapted for connecting an AC system to a bipolar HVDC transmission line adapted to have a voltage between each pole thereof and earth of 600 kV-1500 kV.

12. The converter station according to claim 1, wherein the converter station is adapted for connecting an AC system to a bipolar HVDC transmission line adapted to have a voltage between each pole thereof and earth of 600 kV-1000 kV.

* * * * *